USO11181076B2

(12) United States Patent
Weldon et al.

(10) Patent No.: US 11,181,076 B2
(45) Date of Patent: Nov. 23, 2021

(54) ROCKET ENGINE BIPROPELLANT SUPPLY SYSTEM INCLUDING AN ELECTROLYZER

(71) Applicants: Kevin Michael Weldon, Greensburg, PA (US); Daniel Patrick Weldon, Greensburg, PA (US)

(72) Inventors: Daniel Patrick Weldon, Greensburg, PA (US); Kevin Patrick Weldon, Greensburg, PA (US)

(73) Assignee: Kevin Michael Weldon, Greensburg, PA (US)

( * ) Notice: Subject to any disclaimer, the term of this patent is extended or adjusted under 35 U.S.C. 154(b) by 981 days.

(21) Appl. No.: 15/059,884

(22) Filed: Mar. 3, 2016

(65) Prior Publication Data

US 2017/0254296 A1 Sep. 7, 2017

(51) Int. Cl.
*F02K 9/42* (2006.01)
*F02K 9/97* (2006.01)
(Continued)

(52) U.S. Cl.
CPC .............. *F02K 9/605* (2013.01); *F02C 9/58* (2013.01); *F02K 9/42* (2013.01); *F02K 9/425* (2013.01);
(Continued)

(58) Field of Classification Search
CPC ... F02K 9/42; F02K 9/425; F02K 9/44; F02K 9/46; F02K 9/50; F02K 9/972; F02K 9/64; F02K 9/605; B64G 1/401; B64G 1/402
See application file for complete search history.

(56) References Cited

U.S. PATENT DOCUMENTS

| 2,671,312 A | 3/1954 | Roy |
| 3,170,295 A | 2/1965 | Dryden |

(Continued)

FOREIGN PATENT DOCUMENTS

| JP | 07299157 A | * | 11/1995 |
| JP | 5113230 B2 | * | 1/2013 |

(Continued)

OTHER PUBLICATIONS

Moran Matthew E., Conceptual Study of on Orbit Production of Cryogenic Propellants by Water Electrolysis, NASA Technical Memorandum 103730; Jul. 1991, pp. 1-22.*

(Continued)

*Primary Examiner* — William H Rodriguez
(74) *Attorney, Agent, or Firm* — Quinn IP Law

(57) ABSTRACT

According to one contemplated embodiment of the rocket engine invention, water is first pumped from a water tank through a rocket nozzle cooling heat exchanger wherein it is evaporated into said superheated steam. A generator supplies electricity to an electrolyzer that electrolyzes superheated steam into gaseous hydrogen and gaseous oxygen. The gaseous hydrogen and gaseous oxygen is employed for forming an annular curtain of secondary combustion in a divergent rocket engine. The secondary combustion gas surrounds a central thrust of combustion gas produced in an upstream combustion chamber by a primary injection of hydrogen/oxygen supplied from a liquid hydrogen tank and liquid oxygen tank. The rocket liquid hydrogen tank and liquid oxygen tank are pressurized by gaseous hydrogen and gaseous oxygen generated by the electrolyzer.

5 Claims, 1 Drawing Sheet

(51) Int. Cl.
  *F02K 9/60* (2006.01)
  *F02K 9/44* (2006.01)
  *F02K 9/56* (2006.01)
  *F02K 9/64* (2006.01)
  *F02K 9/82* (2006.01)
  *F02K 9/50* (2006.01)
  *F02K 9/52* (2006.01)
  *F02K 9/48* (2006.01)
  *F02K 9/68* (2006.01)
  *F02C 9/58* (2006.01)
  *B64G 1/40* (2006.01)

(52) U.S. Cl.
  CPC .............. *F02K 9/44* (2013.01); *F02K 9/48* (2013.01); *F02K 9/50* (2013.01); *F02K 9/52* (2013.01); *F02K 9/563* (2013.01); *F02K 9/64* (2013.01); *F02K 9/68* (2013.01); *F02K 9/82* (2013.01); *F02K 9/97* (2013.01); *F02K 9/972* (2013.01); *B64G 1/401* (2013.01); *B64G 1/402* (2013.01)

(56) References Cited

U.S. PATENT DOCUMENTS

| | | | |
|---|---|---|---|
| 3,200,583 A | | 8/1965 | Sobey et al. |
| 3,490,235 A | * | 1/1970 | Grant .................... F02K 9/425 204/278 |
| 3,520,137 A | * | 7/1970 | Newman ................ F02K 9/42 60/217 |
| 3,597,923 A | | 8/1971 | Simon |
| 3,828,551 A | | 8/1974 | Schmidt |
| 3,993,653 A | | 11/1976 | Blum et al. |
| 4,011,148 A | | 3/1977 | Goudal |
| 4,220,001 A | | 9/1980 | Beichel |
| 4,771,601 A | * | 9/1988 | Spies .................... F02K 7/18 60/259 |
| 4,825,650 A | * | 5/1989 | Hosford ............... F01K 25/005 60/267 |
| 4,894,986 A | | 1/1990 | Etheridge |
| 4,896,507 A | * | 1/1990 | Hosford ................. F03G 6/065 60/641.8 |
| 4,912,925 A | | 4/1990 | Foust |
| 4,942,733 A | * | 7/1990 | Hosford ............... F01K 25/005 60/267 |
| 5,003,772 A | | 4/1991 | Huber |
| 5,014,507 A | | 5/1991 | Rice et al. |
| 5,148,674 A | * | 9/1992 | Morris .................... F02K 9/56 60/240 |
| 5,279,484 A | * | 1/1994 | Zimmermann ......... B64G 1/12 244/171.1 |
| 5,444,973 A | | 8/1995 | Limerick et al. |
| 5,505,824 A | * | 4/1996 | McElroy ................ C25B 1/04 204/257 |
| 5,873,241 A | | 2/1999 | Foust |
| 5,918,460 A | | 7/1999 | Connell et al. |
| 6,052,987 A | | 4/2000 | Dressier |
| 6,457,306 B1 | | 10/2002 | Abel et al. |
| 6,568,171 B2 | | 5/2003 | Bulman |
| 6,619,031 B1 | * | 9/2003 | Balepin ................. B64G 1/401 60/246 |
| 6,769,242 B1 | * | 8/2004 | Balepin ................. B64G 1/402 60/204 |
| 6,783,824 B2 | | 8/2004 | Steffier |
| 6,918,243 B2 | | 7/2005 | Fisher |
| 7,334,396 B2 | | 2/2008 | Erickson et al. |
| 7,603,843 B2 | | 10/2009 | Froehlich |
| 8,220,249 B2 | | 7/2012 | Kimura et al. |
| 8,262,896 B2 | | 9/2012 | Irvine et al. |
| 8,364,374 B2 | * | 1/2013 | Le Gonidec ............ F02K 9/56 60/207 |
| 8,394,543 B2 | | 2/2013 | Suyama et al. |
| 8,407,981 B1 | | 4/2013 | Johnson et al. |
| 8,413,419 B2 | | 4/2013 | Mungas et al. |
| 8,572,948 B1 | | 11/2013 | Pinera |
| 8,647,478 B2 | | 2/2014 | Aujollet |
| 9,200,374 B2 | | 12/2015 | Perret |
| 2008/0236140 A1 | | 10/2008 | Brady |
| 2009/0288390 A1 | * | 11/2009 | Pavia ..................... F02K 9/64 60/267 |
| 2009/0293448 A1 | * | 12/2009 | Grote ..................... F02K 9/64 60/204 |
| 2010/0300065 A1 | * | 12/2010 | Balepin .................. F02K 9/46 60/204 |
| 2012/0060464 A1 | * | 3/2012 | Grote ..................... F02K 9/64 60/206 |
| 2014/0260186 A1 | * | 9/2014 | Bahn ...................... F02K 9/42 60/257 |
| 2014/0305098 A1 | | 10/2014 | Elias |
| 2015/0055740 A1 | * | 2/2015 | Paluszek ................ G21B 1/00 376/100 |
| 2017/0101963 A1 | * | 4/2017 | Klein ..................... F02K 9/46 |
| 2017/0335797 A1 | * | 11/2017 | Gotzig ................... F02K 9/425 |
| 2017/0335799 A1 | * | 11/2017 | Gotzig ................... F02K 9/425 |
| 2017/0335800 A1 | * | 11/2017 | Gotzig ................... C25B 1/04 |
| 2018/0038316 A1 | * | 2/2018 | Balepin ................... F02K 9/64 |

FOREIGN PATENT DOCUMENTS

| | | | |
|---|---|---|---|
| KR | 20100110941 A | * | 10/2010 |
| KR | 101009498 B1 | * | 1/2011 |
| RU | 2215891 C2 | * | 11/2003 |

OTHER PUBLICATIONS

Brian D Reed et al., Hydrogen/Oxygen Auxiliary Propulsion Technology, Sep. 4-6, 1991, AIAA-91-3440, NASA Technical Memorandum 105249, particularly pp. 7 and 20. (Year: 1991).*

* cited by examiner

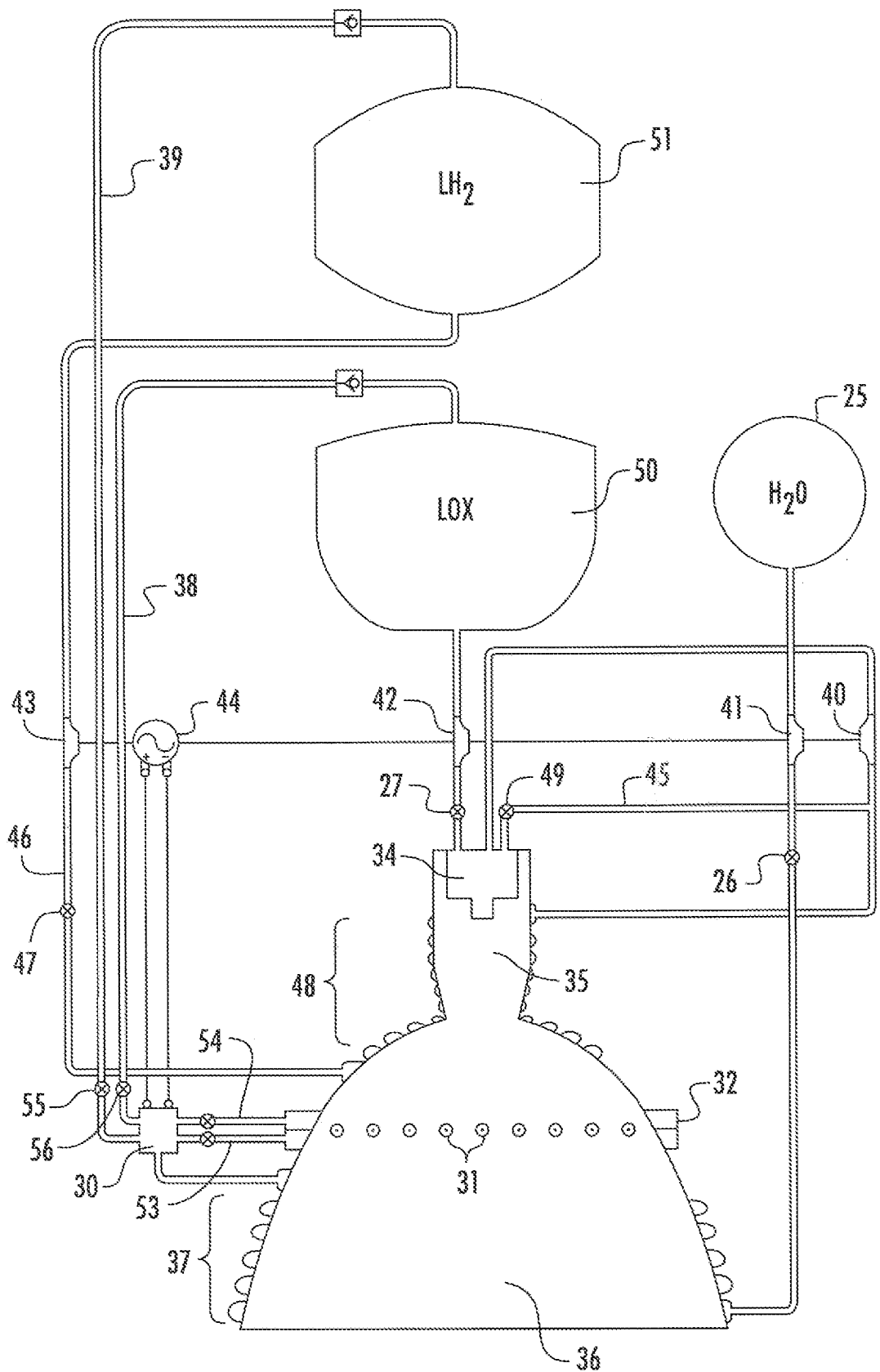

ROCKET ENGINE BIPROPELLANT SUPPLY SYSTEM INCLUDING AN ELECTROLYZER

In the space exploration and satellite industry there is a demand to substantially reduce total mission cost while improving rocket engine performance. The performance and cost of the rocket propulsion system can be a significant factor in obtaining the highest possible science and/or commercial value. Consequently, there exists a need for lower cost fuels with thrust per unit mass and density characteristics that are better than existing rocket propulsion systems.

Rocket propulsion systems are often characterized by their specific impulse, $I_{sp}$. Specific impulse is the specific energy, or the energy of combustion, of the propellants. $I_{sp}$, is defined as the impulse (thrust×time) produced per unit mass of propellant exhausted. In liquid chemical rockets, the specific impulse is determined primarily by the propellants used each combination of fuel and oxidizer releases a particular amount of chemical energy per unit mass when burned.

Some liquid-fueled rockets use a combination of either a room temperature fuel such as, RP-1, kerosene or another high energy combustible fuel combined with liquid oxygen. Other liquid fueled rockets use liquid hydrogen with liquid oxygen. Liquid oxygen/hydrogen rocket engines provide the highest specific energy, and thus the highest $I_{sp}$, of realistically available propellant combination. At any given temperature, liquid hydrogen, having a molecular weight 2.02 g/mol, provides the highest $I_{sp}$ of any propellant.

There is a continuous desire to increase the performance of rocket launches through the use of high density propellants to minimize vehicle tank volume and tank weight. For an atmospheric booster flight, minimizing volume also minimizes the drag loss inefficiency of the rocket. Hydrogen/oxygen have a low density and therefor require greater storage volume but hydrogen/oxygen rockets have much higher rocket specific impulse efficiency. Accordingly, many high performance rocket engines commonly used in the art are bipropellant hydrogen/oxygen. A single hydrogen/oxygen rocket engine with improved propellant density for a given vehicle size and mission is needed.

Liquid hydrogen has a very low density (0.07 g/cm³). The density p of propellants determines the volume, and therefore the mass, of the tanks required to hold them. Strictly based on required storage volume there is a substantial tank mass reduction benefit to avoiding the use of liquid hydrogen as a fuel.

In addition liquid hydrogen is cryogenic, with a boiling point of −253° C. Hydrogen tanks thus require insulation. Liquid Oxygen is also cryogenic, liquid oxygen has a boiling point of −183° C. and the LOX tank also requires insulation. The mass of required insulation and volume for the liquid hydrogen and liquid oxygen tanks can be significant.

High performance hydrogen/oxygen supersonic orbital rockets can have combustion chamber temperatures exceeding 3,100° C.-3,300° C. Accordingly rockets employ rocket engine cooling methods such as a cooling film on the inner surface of a rocket nozzle or commonly for liquid propellant rockets including liquid/hydrogen rockets, the cryogenic liquid fuel and/or cryogenic liquid oxidizer are circulated about the engine nozzle to remove heat before being injected in the rocket combustion chamber.

The input energy required to change the state from liquid to vapor at constant temperature is called the latent heat of vaporization. When a liquid vaporizes at the normal boiling point the temperature of the liquid will not rise beyond the temperature of the boiling point. The latent heat of vaporization is the amount of heat required to convert a unit mass of a liquid into vapor without a change in temperature. The latent heat of evaporation water based on fluid boiling point temperature at atmospheric pressure is as follows:

| Water | 2257 KJ/KG | 40.6 kJ/mol |
|---|---|---|

Water has a high latent heat of vaporization relative to other commonly found elements and compounds, including liquid hydrogen (461 kJ/kg) and liquid oxygen (214 kJ/kg). Water has a higher specific molar heat capacity among many available fluids, is inexpensive and is in plentiful supply. With its high specific molar heat capacity and high latent heat of vaporization water can be used to remove very large amounts of heat from rocket nozzle walls. Hydrogen and oxygen production from water employing electrolysis is well-known in the art. A pure stoichiometric mixture may be obtained by water electrolysis, which uses an electric current to disassociate the water molecules:

$$\text{electrolysis}: 2H_2O \rightarrow 2H_2 + O_2$$

The electrolysis production of hydrogen and oxygen from $H_2O$ at higher temperatures in the steam phase results in much higher thermal efficiencies than electrolysis in the water phase. The technical improvements in electrolysis of steam at high temperature continues to advance in the energy industry, particularly in the fuel cell industry. For instance, electrolyte membranes for electrolysis of water/steam are becoming less expensive, smaller, more efficient and lighter in the industry.

At high temperature steam electrolysis of 800° C.-1000° C. hydrogen is created at approximately 2.6 to 3.0 $kWh_{el}/Nm^3 H_2$. In comparison the amount of electricity needed for water electrolysis at ambient temperatures is 4.3 to 4.9 $kWh_{el}/Nm^3 H_2$. To achieve the aforesaid high temperature electrolysis, $H_2O$ is supplied as high temperature superheated steam to the electrolyzer. U.S. Pat. No. 8,647,478 (Aujollet); 8,262,896 (Irvine et al.); 9,200,374 (ferret), and 3,993,653 (Blum et al.) disclose steam electrolysis methods and apparatus are all hereby incorporated by reference in their entirety.

The efficiency improvement of high-temperature steam electrolysis is best appreciated by assuming that the electricity used comes from a heat engine and then considering the amount of heat energy necessary to produce one kg hydrogen (141.86 megajoules), both in the high-temperature electrolysis process itself and also in producing the electricity used. At 100° C., 350 megajoules of thermal energy are required (41% efficient). At 850° C., 225 megajoules are required (64% efficient).

Water storage is simple compared to LOX and $LH_2$ storage. Water storage does not need as highly efficient insulation systems as cryogenic liquids. Water is easier to store at thermal equilibrium, especially during ground and launch phases of operations. Water is a more compact volumetrically efficient method of hydrogen and oxygen storage, requiring 2.35 times less volume than an equivalent quantity of LOX and LH2. The specific volume for liquid oxygen, hydrogen and water is as follows:

| Liquid Oxygen: | p = 1,141 g/l | .00087 l/g |
| Liquid Hydrogen: | p = 71 g/l | .01408 l/g |
| Water: | p = 1,000 g/l | .00010 l/g |

The relative volumetric storage requirement of water needed to supply an equivalent amount of bipropellant hydrogen/oxygen fuel is calculated as follows, from the obtain Stoichiometric equation:

$$2H_2O \rightarrow 2H_2 + O_2$$

2 mol $H_2O$ (18.02 g/mol) (11/1000 g)=0.0361
2 mol $H_2$ (2.02 g/mol) (11/71 g)=0.0561
1 mol $O_2$ (32.0 g/mol) (11/1,141 g)=0281

$$\frac{2 H_2O}{2H_2 + O_2}$$
$$\frac{.03601}{.0561 + .0281}$$
$$= 42\%$$

Water requires only 42% of the storage volume required by an equivalent amount of liquid hydrogen liquid oxygen.

In addition to the rocket itself, the launch site will not require as much dedicated $LH_2$ or LOX cryogenics or ground support equipment, water is a simple payload to support and process.

A considerable amount of heat is transferred in all designs of rocket engines. The principle objective of high-temperature rocket design is to safely limit the heat transfer to the materials in critical hot sections such as the injector, combustion chamber, throat, and nozzle.

The walls have to be maintained sufficiently cool so that wall material (e.g. metal) temperatures do not exceed their safe allowable operating limit.

During the ascent phase of flight and until just prior to operation of the upper stage engines, the pressures within the liquid hydrogen and liquid oxygen tanks must be raised. During ascent, the rocket must be stiffened so that it can survive the very high bending and compressive loads generated by aerodynamic, thrust and inertial effects. For instance, half empty tanks of liquid oxygen and liquid hydrogen would diminish the rockets structural strength whereas if the half empty tanks are pressurized with a gas the rocket's structure is stiffened.

In many modern rocket designs, these fuel tank pressurization demands are met by introducing gaseous helium into the ullage spaces of the propellant tanks. This helium is stored in separate vessels, typically as a high pressure gas, and is delivered via valves to the propellant tanks at need. Helium is commonly used since it has a low density, is chemically inert, and does not condense to a liquid at the cryogenic temperatures seen in the liquid hydrogen tank and liquid oxygen tank. The helium gas although typically stored on board at relatively high pressure low volume is not in a more preferred compact liquid state.

In consideration of the above there is a need to provide a propulsion system for rockets having a light weight, efficient and compact tankage system for supplying hydrogen and oxygen.

SUMMARY

According to one contemplated embodiment, there is provided a power generator unit to supply electricity to an electrolyzer for the purpose of electrolyzing superheated steam to generate hydrogen and oxygen. The electrolysis produced hydrogen and oxygen is employed for combustion in a divergent rocket engine at a location downstream of a primary injection of hydrogen/oxygen into the primary combustion chamber. Water is pumped from a water tank through a rocket nozzle cooling heat exchanger where it is evaporated into said superheated steam. The rocket further includes both a liquid hydrogen storage tank and liquid oxygen storage tank which are adapted to receive, respectively, gaseous hydrogen and oxygen generated by the electrolysis.

Therefor it is one of the objectives of the contemplated present invention to provide on a rocket an electrolyzer capable of operating at high temperature in endothermal mode during launch and atmospheric flight. Waste heat is utilized to produce superheated steam to be used for more efficient electrolysis, offering a larger production capacity of gaseous hydrogen and gaseous oxygen.

In the preferred embodiment of the present invention the rocket engine water decomposing system is always active either just prior or completion of a first-stage. The electrolyzer decomposes water with both heat and electricity into hot gaseous hydrogen and gaseous oxygen. Thereafter both propellants can be added directly to the combustion chamber and/or their corresponding bipropellant liquid storage tank.

It is desired to maintain the divergent wall in contact with the hot combustion gases. It is desirable to prevent nozzle over-expansion throughout takeoff, initial flight and on through onto higher altitudes so as to achieve better energy efficiency and greater rocket performance. Electrolyzer generated bipropellants are added into the divergent section of the rocket nozzle so as to prevent nozzle overexpansion.

It is desired to maintain the bipropellant tanks adequately pressurized during flight. Electrolyzer generated bipropellant gases are added into the bipropellant storage tanks as the liquid level in the bipropellant tanks substantially drops. These gases are supplied to the tanks so as to stiffen and strengthen the tank structure during atmospheric flight. In the preferred embodiment of the present invention the rocket engine water decomposing system is always active decomposing water with both heat and electricity into hot gaseous bipropellant fuel. Thereafter both propellants are initially injected directly to the divergent combustion chamber section and then subsequently to both the bipropellant liquid storage tanks. The transition from supplying the electrolyzed gaseous hydrogen/oxygen into the rocket nozzle over to just supplying the electrolyzed gaseous hydrogen/oxygen to the liquid hydrogen/oxygen tanks, occurs gradually thought the burn of the first stage rocket engine.

The invention relates to high temperature endothermal electrolysis at above about several hundred degrees Celsius, decomposing steam into gaseous oxygen and gaseous hydrogen. Above this temperature threshold, theory and experimental results in industry have shown that electrolyzers may advantageously have endothermal functioning, that is to say that part of the energy required for decomposing the water molecule is transmitted directly in the form of heat from an external heat source to the electrolyzer. Such endothermal reaction helps absorb excessive high temperature local heat.

In an aspect of the invention, a system for rocket propulsion includes a heat exchanger operable to capture wasted thermal energy, and to transfer the thermal energy to a non-cryogenic liquid to assist in decomposing the supplied non-cryogenic liquid into an oxidizer and fuel.

A supersonic rocket propulsion system is contemplated that includes a combustion chamber, throat and a downstream divergent nozzle section. The nozzle generates thrust by directing the products of the combustion out of the system. The nozzle divergent section is operable to receive electrolysis decomposed oxidizer and electrolysis decomposed fuel, and allow the two to combust.

In the contemplated present invention with a conductive thermal exchange relationship with the rocket engine, flowing water draws heat away from the rocket engine. Water has a high specific heat capacity and does not require complex or maintenance intensive fluid handling equipment. Resulting superheated steam is utilized in electrolysis.

Thrust motors of the jet propulsion type are known in the art. They ordinarily comprise a combustion chamber with an exhaust nozzle leading from the chamber to the exterior, the fuel being burned at a rapid rate in the chamber and the hot gases resulting from the combustion gas being ejected at high velocity through the nozzle exit. High degrees of heat are generated in the chamber and the exhaust nozzle. The present invention provides at least one nozzle heat exchanger cooling means to maintain the rocket nozzle temperature below a dangerous level. The present invention uses non-cryogenic water as a cooling transfer fluid.

In an aspect of the contemplated present invention, a system for rocket propulsion includes a heat exchanger operable to cool a rocket engine nozzle and to regenerate otherwise wasted thermal energy. Nozzle thermal energy is regenerated by heating non-cryogenic water supplied to an electrolyzer. The water is heated into steam in a first heat exchanger and then decomposed into hydrogen and oxygen. By using heat that otherwise is often wasted, the present invention increases the overall operating efficiency of the rocket. In addition, a second nozzle heat exchanger is employed to heat one cryogenic bipropellant. The heated one bipropellant powers a turbine which drives a shaft for rotating pumps and an electrical generator.

A water supply tank onboard a rocket, the water is ultimately used, after it is electrolyzed into hydrogen and oxygen, to pressurize both the liquid oxygen tank and liquid hydrogen tank without adding much unnecessary mass.

Water tank storage volume is much smaller and water storage is not complex, resulting in a lower hardware weight and therefore more efficient propulsion system.

The invention will be better understood from the following detailed description of specific embodiments thereof, taken in conjunction with the accompanying drawings in which:

DETAILED DESCRIPTION

Preferably for the reasons set forth above it is desirable to heat water into steam prior to electrolysis to reduce the amount of electrical energy required to produce hydrogen and oxygen. Hence more hydrogen and oxygen can be produced with less electricity. During rocket engine combustion it is necessary to cool the rocket engine supersonic nozzle so that the metal materials or other acceptable material used for constructing the rocket engine supersonic nozzle does not fail during flight. Active cooling is used for engines where one of the propellant constituents is circulated through cooling passages around the thrust chamber prior to injection and burning of the propellant in the combustion chamber. See U.S. Pat. No. 5,014,507 (Rice et al.); 5,003,772 (Huber) and 4,912,925 (Foust) are all hereby incorporated by reference in their entirety. The thermal energy absorbed by the present invention propellant coolants is not wasted as it augments the initial energy content of the propellant prior to injection, thereby increasing the exhaust velocity and propulsive performance.

It is contemplated that the heat from combustion the rocket engine during flight serves as an available high-temperature heat source for vaporizing water into superheated steam, between 650° C. to 1000° C. The superheated steam is supplied to the electrolyzer for electrolysis of the steam into hydrogen and oxygen. Since steam electrolysis is a heat absorbing reaction, endothermic, it would also be useful in assisting in localized cooling of the rocket engine nozzle or other hotspots. The endothermic heat energy is absorbed from the electrolyzer's adjacent surroundings.

In FIG. 1 a primary injector means 34 is in communication with the upstream combustion chamber 35 of the rocket engine supersonic nozzle. Secondary injectors 31 uniformly circumscribe the axil flow path of the rocket supersonic nozzle. The secondary injectors are located downstream of the primary injector means 34. An electrolyzer means 30 decomposes superheated steam. The decomposed gaseous hydrogen and gaseous oxygen are supplied separately to the secondary injectors 31 by a dual manifold 32. The dual manifold supplies the oxygen and hydrogen to each of the secondary injectors 31. The hydrogen and oxygen are not comingled until after exiting the secondary injector 31 outlets inside the divergent section 36 of the nozzle. Each secondary injector may have a central outlet for oxygen and coaxial annulus outlet for hydrogen, see U.S. Pat. No. 6,918,243 (Fisher) which is hereby incorporated by reference in its entirety. Alternatively, it is contemplated that in another preferred embodiment the oxygen and hydrogen instead of having coaxial outlets may have spaced separate injector outlets; the axial flow paths of the oxygen and hydrogen are angled so as to intercept and mix together downstream of their outlets. See FIG. 2 in U.S. Pat. No. 6,568,171 (Bulman) which is hereby incorporated by reference in its entirety. This configuration of secondary injectors 31 creating a second combustion chamber is well suited rocket first-stages launched from the ground, which require high thrust and low expansion ratios for takeoff and initial ascent.

In FIG. 1 an electrolyzer means 30 is located adjacent the dual manifold 32. As discussed above superheated stream electrolysis in an endothermic reaction absorbing heat. In brief the benefit of high-temperature steam electrolysis stems from the fact that a portion of endothermic heat of reaction can be supplied by thermal energy instead of electric energy. Accordingly, the endothermic nature of the electrolyzer may provide relative cooling of the downstream dual manifold and other local rocket structure. As can be appreciated the position and shape of the electrolyzer means 30 in FIG. 1 is only symbolic for purposes of disclosing the invention. Hence it should be understood that it would be within the capabilities of a skilled artisan to shape an electrolyzer means and position the electrolyzer means so as to provide for cooling of rocket engine hotspots were it would be most beneficial and practical. During the electrolysis operation of the present invention water (steam) is supplied to the steam electolyzer means 30. The heat needed for transforming tank 25 water into superheated steam for the electrolysis operation in the present invention is provided by the rocket nozzle water cooling means 37. The temperature of the steam upon exiting the heating means 37 to be 600° C. to 1000° C.; 750° C. to 950° C.; 800° C. to 900° or approximately 850° C. In one contemplated preferred embodiment of the invention the electrolyzer means employs a solid-oxide electrolyte. Other electrolyzer means are well-known in the art. See U.S. Pat. No. 8,647,478 (Aujollet); 8,262,896 (Irvine et al.); 9,200,374 (Perret); and 3,993,653 (Blum et al.) which disclose high temperature steam electrolyzer means which are all hereby incorporated by reference in their entirety.

In a preferred embodiment it is contemplated that the water tank 25 is a sphere, as is well known in structural engineering, a sphere distributes all tension or compression forces equally giving maximum strength. It is contemplated that the water tank shall be much smaller in volume than both the volume of the liquid hydrogen tank and liquid oxygen tank. The liquid hydrogen tank and liquid oxygen tanks supply most of the bipropellant for the rocket engine. These liquid hydrogen and oxygen tanks supply all the bipropellant for the primary combustion central rocket thrust. Accordingly, it is contemplated that a smaller spherical water tank need not be pressurized during the flight.

Gaseous hydrogen gaseous oxygen are generated and discharged by the electrolysis of superheated steam on the outlet side of the electrolyzer means 30. The outlet side of the electrolyzer means has a conduit 38 for communicating generated gaseous oxygen to the liquid oxygen tank 50; and a conduit 39 on the outlet side of the electrolyzer means for communicating the generated gaseous hydrogen to the liquid hydrogen tank 51. See U. S. Pat. Nos. 5,918,460 (Connell et al) for employing heated gaseous oxygen to pressurize the liquid oxygen tank and heated gaseous hydrogen to pressurize the hydrogen tank, which is incorporated by reference.

An electric generator unit 44 supplies the necessary electricity to the electrolyzer means for decomposing the steam. The generator unit 44 is powered by an onboard turbine 40 that is connected to the generator by a shaft. See U.S. Pat. No. 4,011,148 (Goudal) which is incorporated by reference in its entirety. In addition to powering the generator unit, the turbine 40 shaft is likewise connected to a liquid oxygen pump 42, water pump 41 and liquid hydrogen pump 43. The turbine is initially started by a gas generator system which are well known in the art (not shown). See U.S. Pat. Nos. 4,220,001 (Beichel); 3,828,551 (Schmidt) and U.S. Patent Application Publication 2014/0305098 (Elias). Alternatively, it is contemplated that in another preferred embodiment (not shown) no turbine drive is used and all the pumps may be driven by electric motor(s) having an on-board electrical power source, including but not limited to batteries, see U.S. Pat. No. 6,457,306 (Abel). It is further contemplated that said on-board electrical power source could be used to provide electricity to the electrolyzer means and then there would be no need for an electrical generator.

FIG. 1 illustrates a tank 25 for holding water, the water is supplied to the rocket engine nozzle to assist in cooling the nozzle during combustion. In FIG. 1 the water is pressurized by pump 41 to flow through helical cooling passages 37 encircling the rocket nozzle. After exiting the helical heat exchanger 37 the now superheated steam flows into electrolyzer means 30. A control valve 26 is employed to control the flow of water to both the cooling passages 37 and the further downstream electrolyzer means 30. Other active fluid heat exchanger means known in the art for transferring heat away from the nozzle may be employed in the present invention. See U.S. Pat. Nos. 7,603,843 (Froehlich) and 6,783,824 (Steffier) which are hereby incorporated by reference.

The term "overexpanded nozzle" refers to when the gas expansion occurring in the nozzle results in a gas pressure at the nozzle exit that is below ambient atmospheric pressure. An overexpanded nozzle results in gas flow separation from the nozzle wall and consequently rocket thrust reduction. For a fixed nozzle flow path configuration, including but not limited to throat diameter, overexpansion will vary with the combustion chamber pressure and the ambient pressure. As a rocket gains altitude and loses mass, the thrust requirement decreases, and as the external pressure drops, the risk of a negative propulsion component due to overexpansion of the core gas is gradually eliminated as the rocket reaches higher and nearer to the vacuum of space.

Underexpansion is if the internal gas pressure at the rocket nozzle outlet is higher the local atmospheric or external pressure. The expansion of gas inside the nozzle is not complete and further gas expansion occurs outside the nozzle wasting thrust energy instead of delivering that energy to the rocket. If the nozzle is not perfectly expanded, then loss of efficiency occurs from overexpansion or underexpansion. A mission having perfect expansion throughout is only achievable with a variable-exit area nozzle (since ambient pressure decreases as altitude increases). Because of the enormous design difficulties and cost of a variable-exit area nozzle, a variable-exit area rocket nozzle has never been successfully adopted in the industry.

In addition to inefficiency, separation causes rocket thrust instabilities that can cause damage to the nozzle or simply cause control difficulties of the rocket and/or the engine.

In accordance with this invention, a secondary combustion is generated in the outer annular region of the divergent section of the nozzle. The secondary combustion is provided by secondary injectors 31. Hydrogen and oxygen gases are supplied to the injectors 31 by conduits 53 and 54. Both conduits 53 and 54 have control valves (unnumbered) for controlling the flow rate of the gases to the secondary combustion zone. Thus, hydrogen and oxidizer can be injected through the secondary injectors into the divergent section 36. The secondary injectors 31 direct the gaseous hydrogen and gaseous oxygen into the annular region of the divergent section and they immediately combust after injection. The secondary injectors 31 are of the gag-gas type.

In FIG. 1 the rocket engine includes a primary combustion chamber 35 and a divergent nozzle section 36 downstream from the throat. Hydrogen 51 and oxidizer 50 are fed to the primary injector(s) 34 for combustion in the primary chamber 35. A pump 43, causes the liquid hydrogen in tank 51 to flow into the rocket nozzle upstream helical heat exchanger 48. The now heated hydrogen is in communication with a turbine 40 and a bypass flowpath 45. Both the bypass and downstream side of the turbine 40 communicate with primary injector 34. Control valve 47 in flowpath 46 and control valve 49 in bypass flowpath 45 are used to regulate the cooling of the rocket nozzle, turbine output power and flowrate of hydrogen fuel to the primary injector 34. The liquid oxygen tank 50 is in more direct communication with the primary injector 34. A pump 42 receives liquid oxygen from the tank 50. The liquid oxygen exits the pump into a flowpath in communication with the primary injector 34, a control valve 27 is employed to regulate the flow of liquid oxygen exiting from the primary injector 34.

The primary combustion chamber injector(s) 34 may be of the gas-liquid type or gas-gas type, as at least one of the propellants is already largely or entirely gaseous. The primary combustion product gas flows through the nozzle throat into the divergent section 36.

Injectors 31 of electrolysis fuel and oxidizer are distributed around the periphery of the nozzle divergent section a relatively short distance downstream of the throat. Upon entering the nozzle from the injectors 31, the injected fuel and oxidizer mix and immediately combust to form secondary combustion gas. The secondary combustion gas forms an annular flow surrounding the primary thrust combustion gas. It is contemplated that at takeoff the secondary hydrogen injectors 31 are at their maximum flow rate so as to prevent the overexpansion of the primary combustion gas core flow. The secondary combustion gas maintains a wall pressure that is equal to or greater than ambient pressure at low altitudes (e.g sea level at Cape Canaveral), eliminating any negative component of the takeoff thrust.

As a rocket employing the contemplated rocket engine invention would continue to climb upward toward space the ambient atmospheric pressure decreases. As the rocket gains altitude and loses mass, the thrust requirement decreases, and as the external ambient pressure drops, the risk of a negative thrust component due to overexpansion of the core gas is gradually eliminated. To accommodate these changes, the flow to secondary injectors are gradually throttled to lower the secondary thrust in continuous manner. As the rocket's altitude increases ever higher the need for any fuel flow to the secondary injectors will gradually cease and their flow will be terminated As the secondary injectors 31 are increasingly throttled down, the now excess electrolyzer generated oxygen gas and hydrogen gas can be increasingly rerouted to the hydrogen and oxygen supply tanks 50 and 51. A valve 55 controls flow from the electrolyzer 30 to the liquid hydrogen tank 51 and a valve 56 controls flow from the electrolyzer 30 to the liquid oxygen tank 50. The electrolyzer generated hydrogen gas and oxygen gas assist in pressurizing tanks 51 and 50 respectively which lose substantial quantities of their liquid propellants during takeoff, the initial flight of the rocket and higher until the present rocket engine booster tank's are empty; the valves 55 and 56 will be controlled so as to continue to increase the flow to both tanks as the rocket engine's altitude becomes higher, and higher.

It should be appreciated that some of each of the gaseous hydrogen and gaseous oxygen supplied from the electrolyzer to their respective cryogenic tanks will cool and possibly condense into liquid hydrogen and oxygen. The first stage rocket engine to be ejected upon the time that at least one tank is at least nearly empty of liquid propellant.

While certain novel features of this invention have been shown and described, it is not intended to be limited to the details above, since it will be understood that various omissions, modifications, substitutions and changes in the forms and details of the illustrated invention and in its operation can be made by those skilled in the art without departing in any way from the spirit of the present invention.

The invention claimed is:
1. A rocket engine comprising:
a liquid hydrogen tank, a liquid oxygen tank and water tank;
an electrolyzer for electrolyzing water supplied from said water tank into gaseous hydrogen and gaseous oxygen;
a nozzle having a combustion chamber, a throat and a divergent section;
a primary injector or a plurality of primary injector in fluid communication with both said liquid hydrogen tank and said liquid oxygen tank;
a manifold surrounding a circumference portion of said divergent section;
a heat exchanger;
wherein said manifold communicates said gaseous hydrogen and said gaseous oxygen to secondary injectors;
wherein said electrolyzer is in fluid communication with said manifold;
wherein said secondary injectors inject said gaseous hydrogen and said gaseous oxygen into said divergent section to produce an annular combustion region about a primary central rocket thrust flow from said combustion chamber;
wherein said heat exchanger is in fluid communication with said water tank;
wherein said heat exchanger is in fluid communication with said electrolyzer;
wherein said heat exchanger is adjacent said nozzle; and
wherein said electrolyzer is in fluid communication with both said liquid hydrogen tank and said liquid oxygen tank.

2. A rocket engine comprising:
a liquid hydrogen tank, a liquid oxygen tank and water tank;
an electrolyzer for electrolyzing water supplied from said water tank into gaseous hydrogen and gaseous oxygen;
a nozzle having a combustion chamber, a throat and a divergent section;
a primary injector or a plurality of primary injector in fluid communication with both said liquid hydrogen tank and said liquid oxygen tank;
a manifold surrounding a circumference portion of said divergent section;
a heat exchanger; and
a plurality of control valves for controlling flow of said gaseous hydrogen and said gaseous oxygen from said electrolyzer,
wherein said manifold communicates said gaseous hydrogen and said gaseous oxygen to secondary injectors;
wherein said electrolyzer is in fluid communication with said manifold;
wherein said secondary injectors inject said gaseous hydrogen and said gaseous oxygen into said divergent section to produce an annular combustion region about a primary central rocket thrust flow from said combustion chamber;
wherein said heat exchanger is in fluid communication with said water tank;
wherein said heat exchanger is in fluid communication with said electrolyzer;
wherein said heat exchanger is adjacent said nozzle; and
wherein said flow of said gaseous hydrogen and said gaseous oxygen to said secondary injectors is at a maximum during initial takeoff.

3. The rocket engine of claim 2, wherein,
said flow of said gaseous hydrogen and said gaseous oxygen to said secondary injectors is increasingly throttled down during rocket ascent by at least one control valve of said plurality of control valves.

4. The rocket engine of claim 3, wherein said plurality of control valves regulate said gaseous hydrogen and said gaseous oxygen to be increasingly rerouted to said liquid hydrogen tank and said liquid oxygen tank while said secondary injectors are increasingly throttled down during rocket ascent.

5. A rocket engine comprising:
a water tank, liquid hydrogen tank and liquid oxygen tank;
a water pump in fluid communication with said water tank;
wherein said water pump is in fluid communication with a heat exchanger;
an electrolyzer for electrolyzing water supplied by said water pump into gaseous hydrogen and gaseous oxygen;
a rocket engine nozzle;
a turbine;
wherein said liquid hydrogen tank in fluid communication with an upstream heat exchanger on said nozzle,
wherein said electrolyzer in fluid communication with said nozzle at a downstream location for communicating said gaseous hydrogen and said gaseous oxygen to said nozzle, wherein said upstream heat exchanger is in fluid communication with said turbine, and wherein said turbine powers an electric generator for supplying electricity to said electrolyzer.

\* \* \* \* \*